Dec. 17, 1935. H. L. SHAW 2,024,888
TIRE RETREADING APPARATUS
Filed Jan. 28, 1935 2 Sheets-Sheet 1
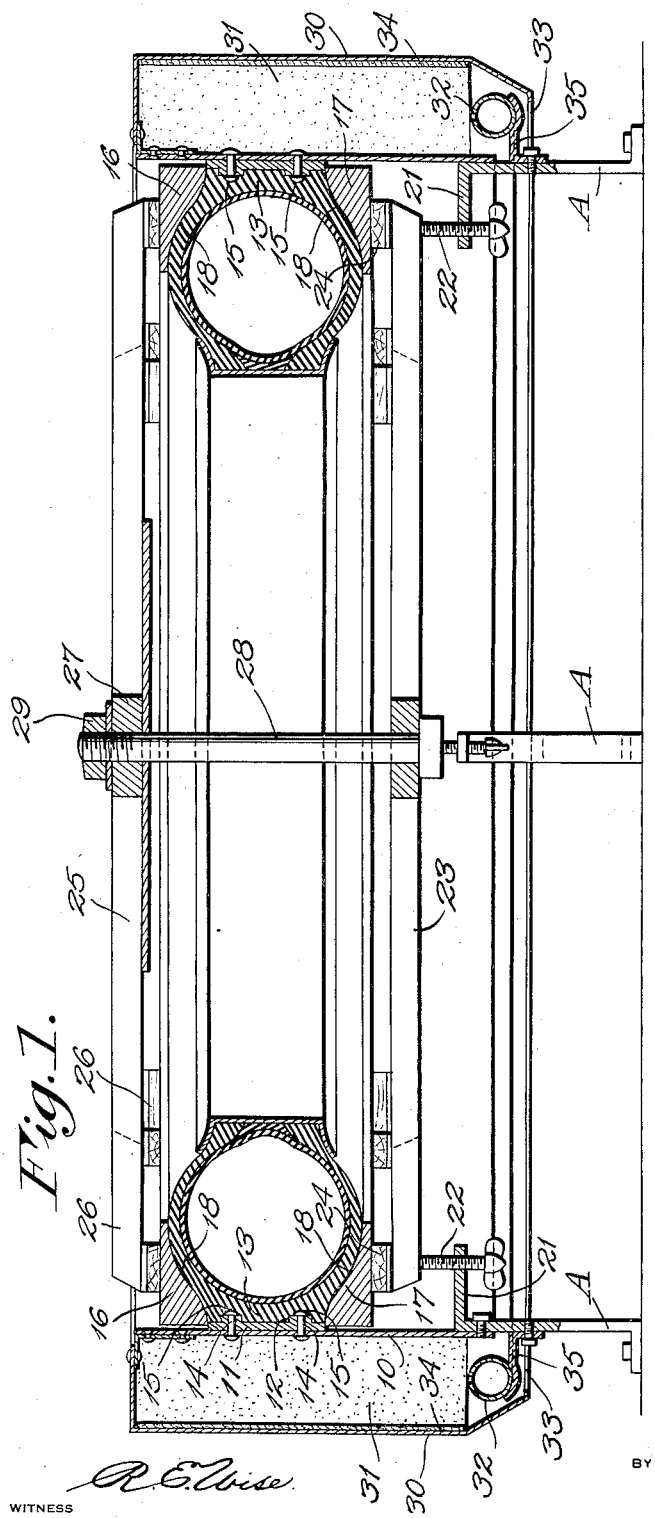
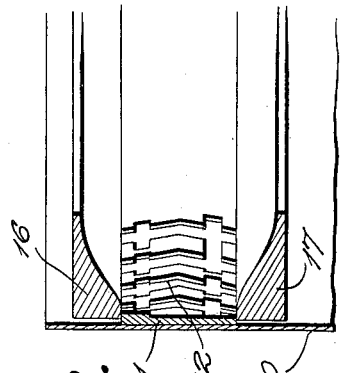
Howard L. Shaw
INVENTOR
BY Victor J. Evans & Co.
ATTORNEY

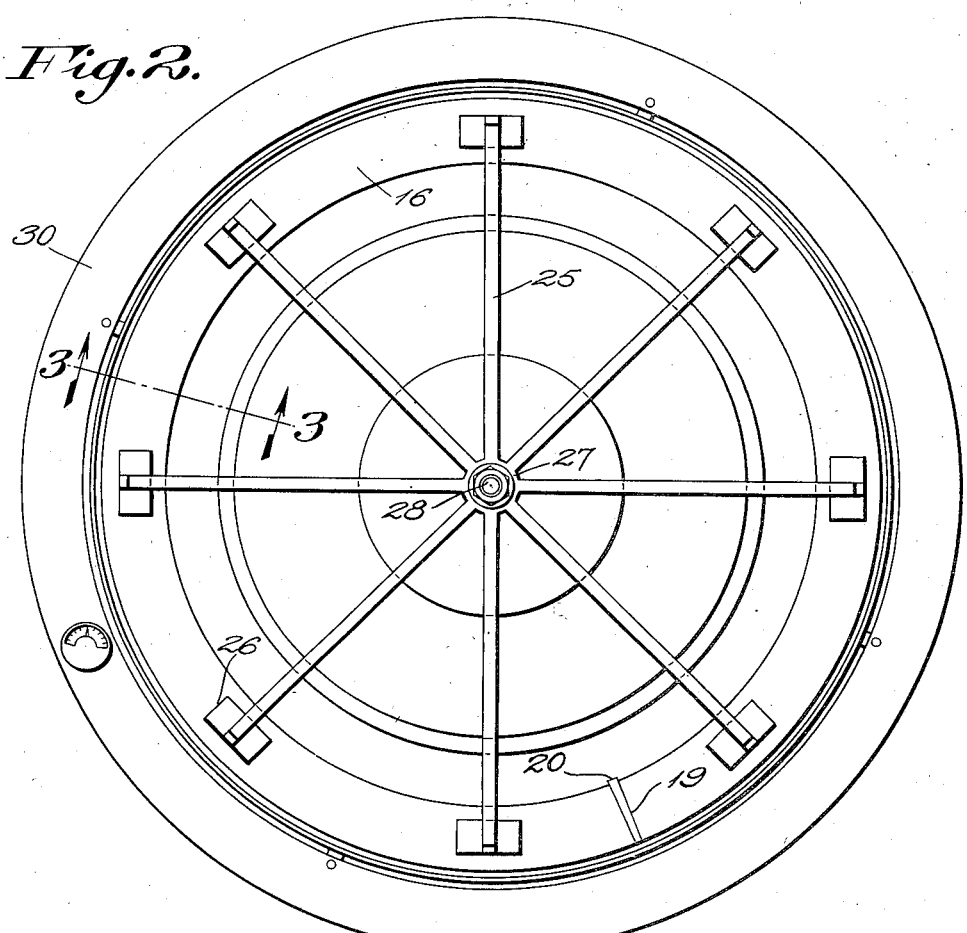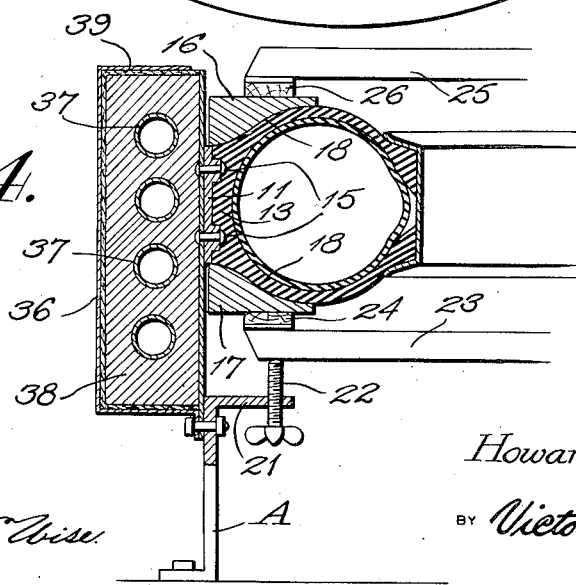

Patented Dec. 17, 1935

2,024,888

UNITED STATES PATENT OFFICE 2,024,888

TIRE RETREADING APPARATUS

Howard L. Shaw, Frostburg, Md.

Application January 28, 1935, Serial No. 3,856

3 Claims. (Cl. 18—18)

The invention relates to a tire retreading apparatus and more especially to a retread vulcanizer.

The primary object of the invention is the provision of an apparatus of this character, wherein through the use of a full circle die and matrices, a tire shoe or casing can be conveniently retread by curing of the rubber through vulcanization, the assembly of the parts of the apparatus being novel for convenient insertion of the tire shoe or casing and for removal thereof.

Another object of the invention is the provision of an apparatus of this character, wherein the matrix members are susceptible of a determined range of adjustment to accommodate therebetween tire shoes or casings of different sizes for retreading purposes.

A further object of the invention is the provision of an apparatus of this character, which is extremely simple in its construction, thoroughly reliable and efficient in its operation, possessing but few parts, yet being strong, durable, readily and easily handled, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a vertical sectional view through a vulcanizing apparatus constructed in accordance with the invention, showing a tire therein for retreading of the same.

Figure 2 is a top plan view of the vulcanizer.

Figure 3 is a fragmentary detail sectional view through the apparatus on the line 3—3 of Figure 2, showing a part elevation of the tread die and the relationship of the matrices thereto.

Figure 4 is a fragmentary sectional view showing a slight modification.

Similar reference characters indicate corresponding parts throughout the several views in the drawings.

Referring to the drawings in detail, A designates suitable supporting legs which carry the main annular frame 10 which, in this instance, is a circular band presenting a vertical wall. Fixed interiorly of this frame 10 is a tread die 11 which is of full circular formation having the design face 12 for ornamentation of the retread area of a tire shoe or casing 13 on vulcanizing of the same within the apparatus. The die 11 is held in place by rivets 14 upon the frame 10 and these rivets have the round heads 15 which augment the design formation as created in the retread area of the tire 13 by the die 11. The rivets 14 engage in the frame so that the die 11 is fixedly held therewith.

Above and below the die 11 and removably contained in the frame 10 are the upper and lower matrices 16 and 17, respectively, these having the work-engaging faces 18 and being susceptible of a wide range of adjustment so that there can be accommodated therebetween tires of different sizes. Each matrix 16 is of annular form and transversely split, at 19, which latter accommodates a filler or wedge 20 to close the gap as constituted by the split when the matrix is in use and fitted within the frame 10 for the vulcanization period in retreading the tire 13.

The legs A at their upper ends are of bracket formation, as at 21, where they carry adjusting screws 22 coacting with a plural armed lower spider 23, its arms carrying contact blocks 24 engageable by the matrix 17 next to this lower spider. The upper matrix 16 has the upper spider 25 similar to the lower spider 23 superimposed and with its contact blocks 26 resting upon said matrix. These spiders 23 are constituted with center hubs 27 for receiving a headed tie bolt 28 carrying a nut 29 threaded thereon.

Externally of the frame 10 and disposed concentrically about the same is a housing 30 providing a heat chamber 31 and within the latter is a burner ring 32 for the heating of said chamber, the bottom of the housing being provided with air ports or vents 33 and the outer wall of said housing at its inner face being augmented by an insulation or heat resisting lining 34 so that heat will radiate through the frame 10 for the heating of the die 11 for vulcanization in the process of retreading the tire 13 in the use of the apparatus. The burner ring 32 is seated upon holding arms 35 as carried by the legs A.

In Figure 4 of the drawings there is shown a slight modification of the invention and therein the housing 36 confines a steam coil 37 therein which is embedded in a filler 38 occupying the chamber as created by the housing 36. The top, bottom and outer walls of this housing at their inner surfaces are covered with a heat resisting lining 39 to assure heat radiation through the main frame and inwardly thereof of the apparatus.

Of course, it is to be understood that the heat responsive means may be varied, altered or changed as the apparatus can be electrically heated or otherwise, the adjustment of the matrices 16 and 17 being important to have the apparatus accommodate varying sizes of tires so that they may be retreaded by vulcanization, the rubber of the retread area being cured by heat.

The design or ornamentation of the die 11 may be varied according to the fancy of the user of the apparatus and the design face 12 is merely an example.

What is claimed is:

1. An apparatus of the character described comprising a main full circular frame, a full circular die fitted within the frame, split annular matrices above and below said die, spiders acting against the matrices and having contact blocks engaged therewith, tie means connecting the spiders, and a heating element concentrically of the frame and a part thereof.

2. An apparatus of the character described comprising a main full circular frame, a full circular die fitted within the frame, split annular matrices above and below said die, spiders acting against the matrices and having contact blocks engaged therewith, tie means connecting the spiders, a heating element concentrically of the frame and a part thereof, supporting legs for the frame, and adjustable means carried by the supporting legs and engaged by the lowermost spider for permitting adjustment of the matrix next thereto.

3. An apparatus of the character described comprising a main full circular frame, a full circular die fitted within the frame, split annular matrices above and below said die, spiders acting against the matrices and having contact blocks engaged therewith, tie means connecting the spiders, a heating element concentrically of the frame and a part thereof, supporting legs for the frame, adjustable means carried by the supporting legs and engaged by the lowermost spider for permitting adjustment of the matrix next thereto, and heat resisting insulation outermost with respect to said heating element for radiation of heat inwardly of said frame.

HOWARD L. SHAW.